UNITED STATES PATENT OFFICE.

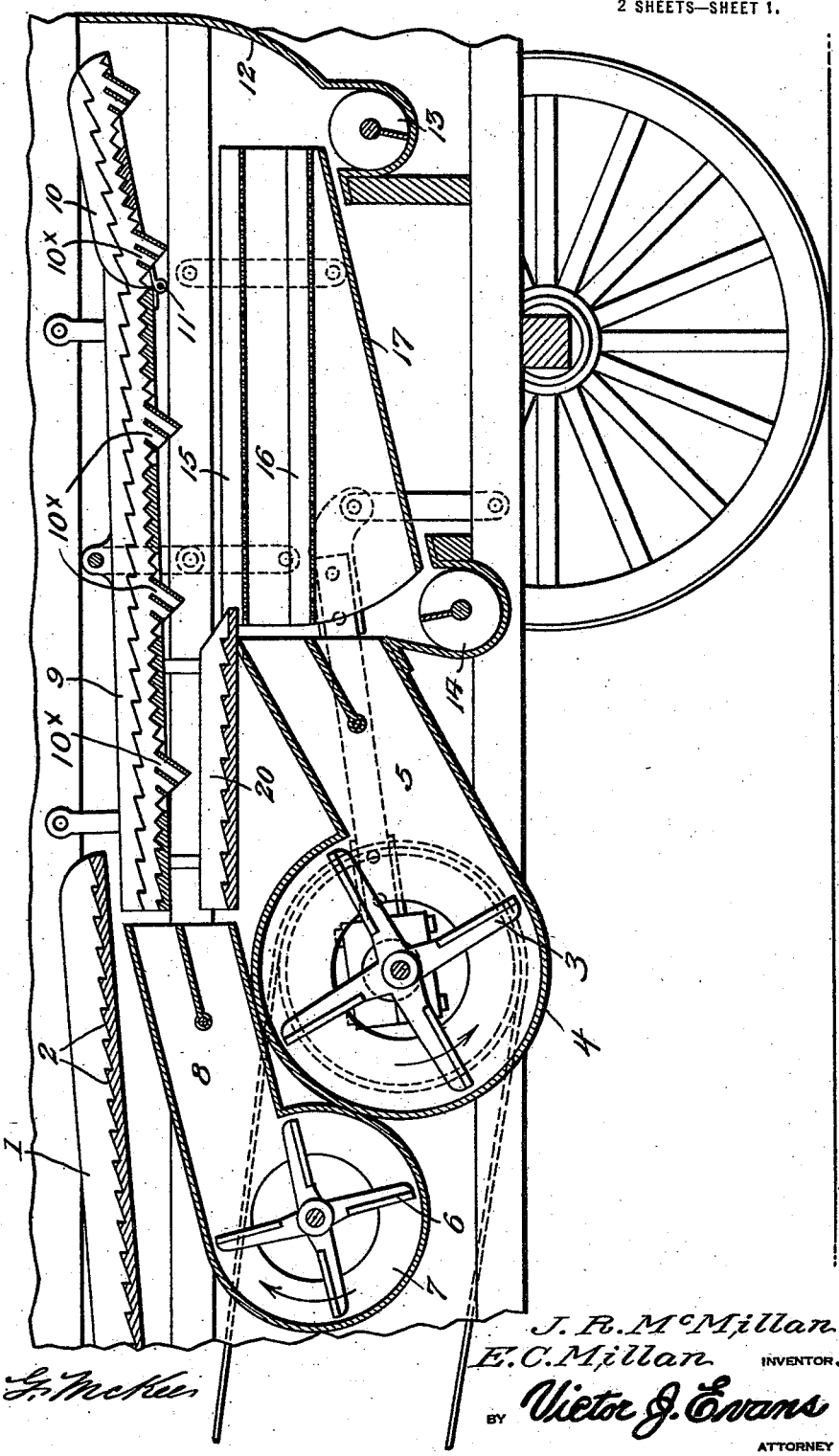

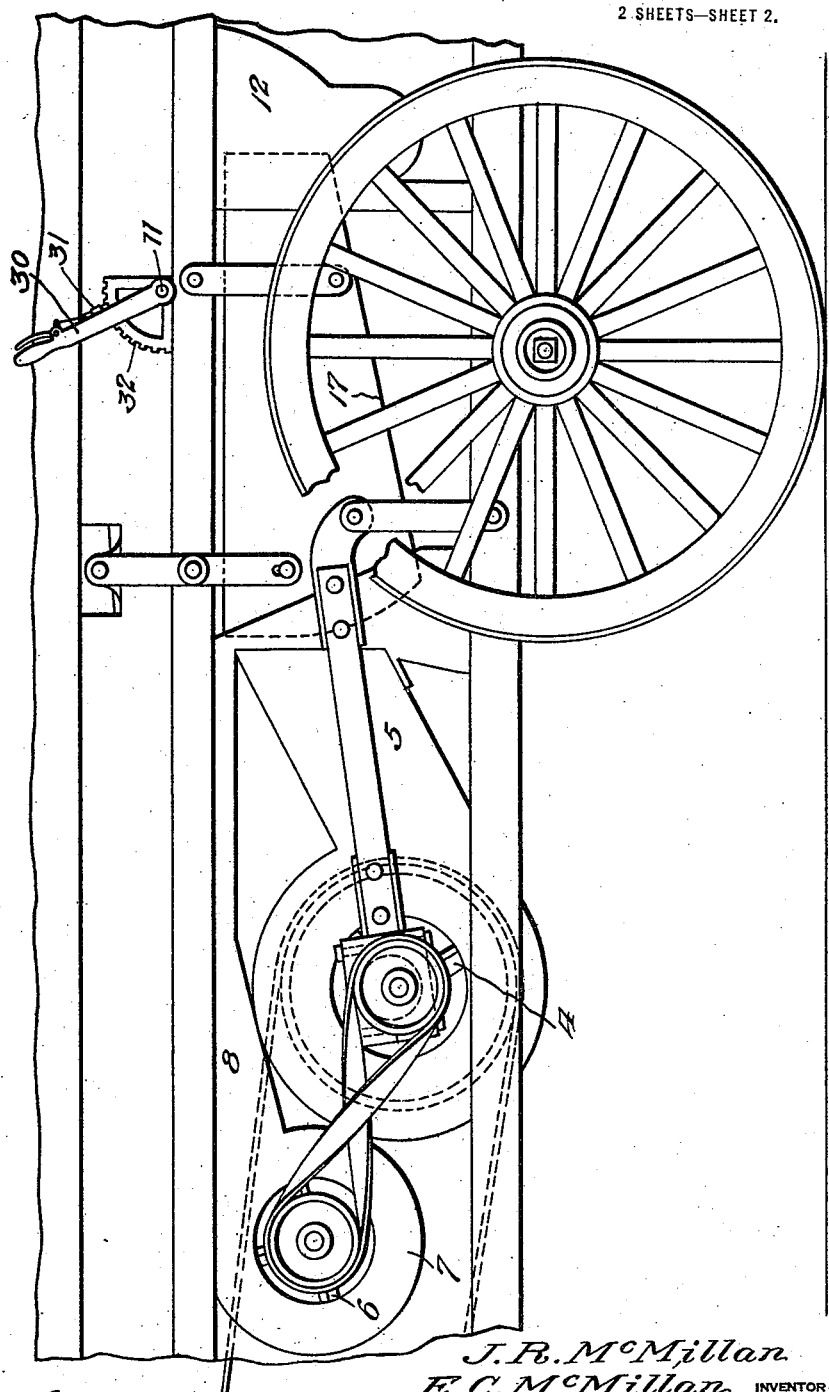

JOHN R. McMILLAN AND ERNEST C. McMILLAN, OF BUSHONG, KANSAS.

CLEANING ATTACHMENT FOR THRASHING MACHINES.

1,415,666. Specification of Letters Patent. Patented May 9, 1922.

Application filed July 17, 1920. Serial No. 396,976.

*To all whom it may concern:*

Be it known that we, JOHN R. McMILLAN and ERNEST C. McMILLAN, citizens of the United States, residing at Bushong, in the county of Lyon and State of Kansas, have invented new and useful Improvements in Cleaning Attachments for Thrashing Machines, of which the following is a specification.

The object of our present joint invention is the provision of a simple, durable and highly efficient cleaning attachment for thrashing machines.

To the attainment of the foregoing, the invention consists in the improvement as hereinafter described and definitely claimed.

In the accompanying drawings, hereby made a part hereof:

Figure 1 is a longitudinal vertical section showing a cleaning attachment constructed in accordance with our invention as properly arranged relatively to a thrashing machine.

Figure 2 is a side elevation illustrative of the improvement.

Similar numerals of reference designate corresponding parts in all of the views of the drawings.

The grain pan 1 of the thrashing machine is provided in accordance with our invention, with a plurality of rearwardly directed spaced serrations 2.

At 3 is a rotary cleaning fan, and at 4 is the casing thereof from which extends an upwardly and rearwardly directed conduit 5.

In accordance with our invention, and in front of the fan 3, is an auxiliary rotary fan 6 that is disposed in a casing 7 having an upwardly and rearwardly directed conduit 8, the discharge end of which is disposed below and substantially in vertical alignment with the rear end of the grain pan 1.

Disposed below and in spaced relation to the pan 1 with the serrations 2, and extending rearwardly a considerable distance beyond said pan 1 is a chaffer 9 having at its rear end an extension 10 connected to the chaffer or chaffer-body 9 in the manner hereinafter specifically described. The chaffer 9 and its extension 10 are provided with discharge spouts 10×.

Extending below the chaffer body 9 and the extension 10 is a casing 12 in which is disposed a tailings auger 13 and a grain auger 14. In the said casing 12 is an upper shoe sieve 15, and a lower shoe sieve 16, and it will here be noted that the bottom 17 of the casing 12 is inclined and therefore adapted to serve as a chute for the conveyance of the grain to the auger 14.

By virtue of the construction and relative arrangement of the elements described, it will be readily understood that the thrashed grain and chaff are delivered by the grain pan 1 to the chaffer 9, and that incidental to said delivery the grain and chaff fall through or are subject to the action of a rearward and upward wind-blast emanating from the conduit 8. The chaffer is also subject to the wind-blast from the conduit 5, and it will be noted in this connection that a comparatively short supplemental pan 20 is extended forwardly from the discharge end of the conduit 5, and is arranged below and in spaced relation to the chaffer 9 and has its rear end arranged to deliver grain to the upper shoe sieve 15. As the grain and chaff pass rearwardly from the grain pan 1, the strong blast of air will cause the chaff and other like material to rise, while the grain will gravitate through the front portion of the chaffer and will be received on the supplemental pan 20. It will also be noted that the forward end of the chaffer or chaffer body 9 extends a considerable distance in front of the forward ends of the shoe sieves, with the result that considerable grain is enabled to gravitate to the front portions of the cleaning sieves, and liability of grain being blown over the rear end of the cleaning attachment and into the straw or tailings is reduced to a minimum. We would also have it understood that the lower and rear fan 3 is an under-blast fan, and the uppermost and foremost fan 6 may be made either over-blast or under blast as conditions render most expedient.

In Figure 2 we show the necessary driving connections for the working parts of our improvement, but inasmuch as said driving connections are not of the essence of our invention, we do not deem it necessary to enter into a detailed description of the same.

In the connection of the extension 11 to the chaffer 9, the said extension is fixed to a transverse rockshaft 11, journaled in bearings at the rear end of the chaffer 9. To the said rock shaft 11 is fixed a hand lever 30, disposed at the outer side of the thrasher casing, Figure 2, and equipped with a detent 31 for cooperation with a fixed segmental rack 32. In virtue of this provision the chaffer extension 10 can be adjustably fixed at different angles of inclination as varying conditions require.

Having described our invention what we claim and desire to secure by Letters-Patent, is:

In combination, a grain pan with serrations, a chaffer body arranged below and in spaced relation to the rear portion of said pan and extending rearwardly of the same, a rearwardly extending chaffer section connected to the rear end of the chaffer body, a casing below the chaffer body and chaffer extension, conveyors in said casing, a shoe sieve arranged in said casing and below the chaffer body and chaffer section, a short grain pan section arranged under and in spaced relation to the chaffer body, spouts carried by the chaffer body and extension, the forward of said spouts being arranged to discharge grain to said short grain pan section, means for delivering a rearwardly directed blast of air between the rear end of the grain pan and the forward ends of the chaffer body and the short grain pan section, and means for delivering a rearwardly directed blast of air into the casing and above and below the shoe sieve therein.

In testimony whereof we affix our signatures.

JOHN R. McMILLAN.
ERNEST C. McMILLAN.